Dec. 2, 1958  W. H. SHAPERO  2,862,236
APPARATUS FOR FABRICATING HOLLOW BODIES
Filed Oct. 6, 1953
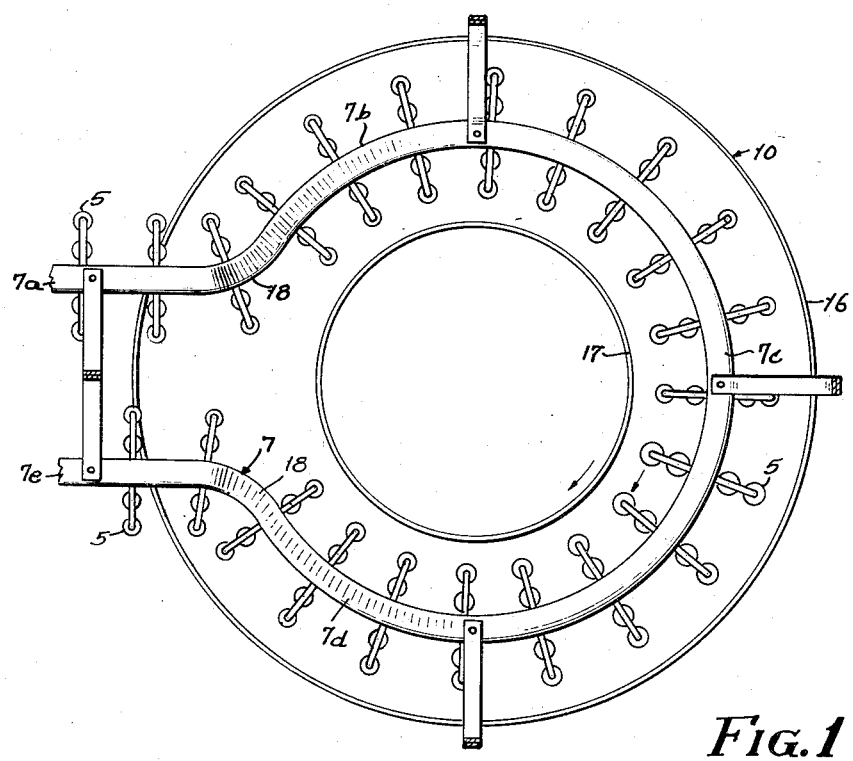
FIG.1
FIG.2
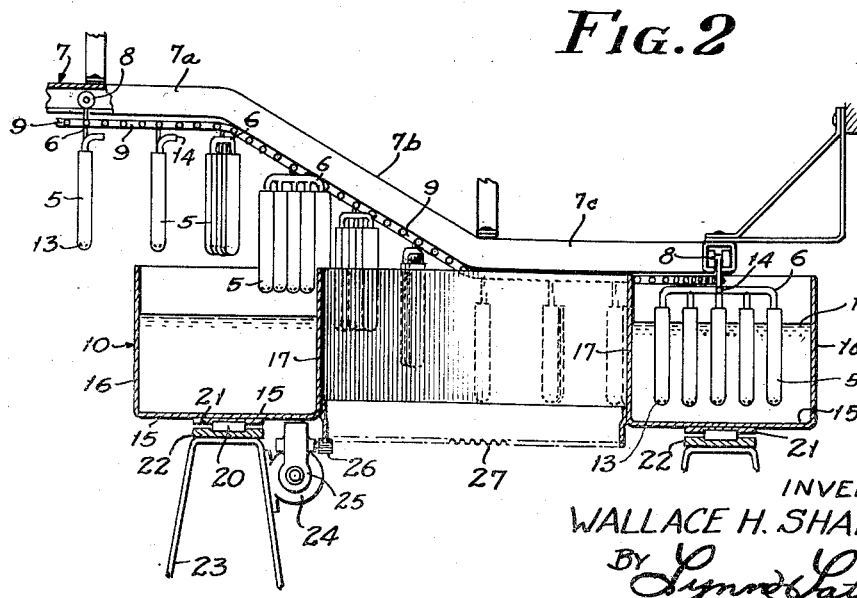
INVENTOR
WALLACE H. SHAPERO
BY Lynn Latta
—ATTORNEY—

United States Patent Office 2,862,236
Patented Dec. 2, 1958

2,862,236

APPARATUS FOR FABRICATING HOLLOW BODIES

Wallace H. Shapero, Los Angeles, Calif., assignor to Wallace Containers Company, Los Angeles, Calif.

Application October 6, 1953, Serial No. 384,494

4 Claims. (Cl. 18—24)

This invention relates to the manufacture of thin walled hollow bodies such as containers, including flexible tubes, and has as its general object to provide an improved apparatus for fabricating such bodies. The present invention constitutes an improvement upon that disclosed in my earlier co-pending application S. N. 249,269, filed October 2, 1951, and now P. N. 2,786,238, of which the present application is a continuation in part.

The invention deals particularly with the type of processing wherein a pre-heated mandrel is dipped into a body of liquid thermoplastic material (e. g. a thermoplastic synthetic resin material in suspension) and a coating of the resin is caused to adhere to and be deposited upon the mandrel by liquid adhesion and by action of the residual heat of the mandrel. More specifically, the invention relates to a continuous type apparatus wherein a series of mandrels, suspended upon an endless conveyor, are carried through a number of stages of processing including one or more stages wherein the mandrels, while constantly moving, are dipped into a body of liquid plastic material contained within a dipping tank, and are maintained in a partially immersed position within the liquid body while continuing to move from a point of entry to a point where they are lifted out of the tank to continue their journey to an area where a subsequent stage of operation is performed thereon. In this connection, one of the primary objects of the invention is to provide apparatus which is directed toward the production of a maximum number of articles per unit of time, and to this end, the continuous aspect of the operation is a basic requirement of the invention.

Maintenance of uniform thickness and quality in the wall of a container is a basic mandatory requirement. This is especially true where color is introduced into an otherwise substantially transparent plastic material such as a polyvinyl chloride or acetate resin, which I find to be especially suitable for the manufacture of tough, flexible, durable container bodies such as flexible tubes for tooth paste, paints, etc., wherein toughness and tensile strength combined with flexibility are required. Where coloring material such as a solid pulverized pigment (e. g., for the purpose of imparting a milky white color to the plastic wall of the container) is added to the liquid plastic suspension, an uneven wall thickness will result in an uneven depth of color, the tube being more translucent in the thinner areas and more opaque in the thicker areas. For this reason alone, substantial uniformity of wall thickness is mandatory. Uniformity of thickness is demanded for other reasons, including the general requirement for keeping at a minimum the total quantity of plastic material necessary in the production of a tube of a given strength requirement. Since any body, subjected to tension, is only as strong as its weakest point, all material in the wall of a container in excess of the thickness thereof at its thinnest point, is completely wasted insofar as meeting bursting strength requirements is concerned.

Exceeding difficulty has been encountered in obtaining uniform wall thickness in a dipped container. These difficulties are greatly enhanced where an attempt is made to fabricate the container in a process utilizing a continuously moving line of mandrels.

A further object is to provide an apparatus whereby plastic containers may be fabricated with wall thickness of sufficient uniformity to provide adequate uniformity in the depth of impression obtained in offset printing operations upon such containers.

With the foregoing in mind, the major object of the present invention is to provide an apparatus whereby hollow bodies may be fabricated upon dipping mandrels in a manner to obtain substantially uniform wall thickness therein.

Other objects will become apparent in the ensuing specifications and appended drawings in which:

Fig. 1 is a plan view of a dipping apparatus by which the invention may be practiced; and Fig. 2 is a vertical sectional view thereof.

Referring now to the drawings in detail, I have shown therein a portion of a dipping apparatus of the general type which is more completely shown in my co-pending application above referred to, the drawings of the present application being confined to an illustration of the improvements therein to which the present invention is directed. For a more complete understanding of other features of the general apparatus and method, reference is made to said co-pending application.

In general, the apparatus utilizes a series of dipping mandrels 5 suspended, by means of hangers 6, from a track 7 in which rollers 8, on the upper end of hangers 6, travel in response to the pull of an endless conveyor chain 9 to which the hangers 6 are linked. The track 7 is bent at various points along its length, to determine the path of travel of the mandrels 5. Thus, the track 7 may include an elevated horizontal stretch 7a for conveying the mandrels to a point above an entry side of a dip tank 10; a downwardly inclined stretch 7b for guiding the mandrels downwardly into the dip tank 10, a horizontal stretch 7c for guiding the mandrels horizontally in the dip tank 10 while a coating of plastic material is deposited upon the mandrels from the body of liquid plastic material 11 within the dip tank, an upwardly inclined stretch 7d for guiding the mandrels upwardly out of the dip tank 10 to a level where they will clear the wall thereof, and another horizontal elevated stretch 7e for guiding the mandrels away from the dip tank 10.

As disclosed in my co-pending application above referred to, the apparatus may include a number of stations along the length of the endless conveyor line, beginning with a station where the bare mandrels are subjected to the action of a heater for heating them to a proper temperature for depositing from the body of liquid plastic, within the length of time during which the mandrel stays in the dip, a coating of the required thickness; a subsequent stage wherein the dipping is performed (which stage is disclosed in the drawings of the present application); a subsequent stage wherein the coated mandrels are passed through an oven for evaporating the solvent and curing the coatings; and a subsequent stage wherein the coatings are removed from the mandrels, as by means of an inflation step wherein air under pressure is injected through the mandrels to inflate the coatings and blow them off the mandrels. To this end, the hangers 6 may be of hollow tube construction, each hanger having at its upper end a fitting 14 to which the nozzle of an air hose may be applied and having a series of branching stems each extending downwardly into a respective mandrel. The lower end of each mandrel may be provided with one or more apertures 13, through which air under pressure may enter between the mandrel and the coating thereon, so as to inflate the coating.

Originally, attempts were made to utilize a stationary, elongated dip tank into which the mandrels were dipped and through which the mandrels were moved in their continuing path of travel. The containers produced with such apparatus had walls of varying thickness, and where color pigment was used, the depth of color varied to an extent such that the tubes were unsatisfactory. Attempts were made to remedy these conditions by varying the consistency of the dip, varying the speed of travel of the mandrels through the dip and by agitating the body of liquid plastic material, but without satisfactory solution of the problem.

When the concept of the present invention was finally developed, it was found that the solution for the problem was to provide for movement of the body of liquid plastic material in unison with the forward travel of the mandrel in such a manner that the dipping movement of the mandrel, although actually occurring in an inclined direction, with a component of forward travel as well as a component of vertical travel, would, with reference to the body of liquid plastic material, constitute simply a vertical dipping movement of the mandrel into and out of the body of material, without relative horizontal movement between the mandrel and the liquid body. The present invention accordingly has provided for movement of the liquid body in unison with the movement of the mandrel, and a coating of uniform thickness was thereby attained. It is now apparent that the previous difficulties were the result of a differential in pressure between the mandrel and the body of liquid as between the leading and trailing sides of the mandrel, the pressure of the liquid at the leading side being relatively high and the pressure of the liquid at the trailing side being relatively low, with a resultant thinning of the coating at the leading side and thickening of the coating at the trailing side.

The present invention achieves a synchronous movement of mandrel and liquid body by the use of a circular dip tank, coordinated with a conveyor line having a portion of its length, above the dip tank, outwardly curved to conform to the curvature of the dip tank along a circumference thereof located inwardly of its periphery.

Merely by way of illustration of an apparatus having these characteristics, I have shown in the drawings a dip tank 10 in the form of a circular annulus having a bottom 15, an outer cylindrical wall 16 and an inner cylindrical wall 17. The low level portion 7c of the track is curved to follow a circumferential axis intermediate the vertical walls 16 and 17, whereby the mandrels 5 may be carried in a path properly registering with the curvature of the tank. The mandrels 5 may be disposed in batteries of several mandrels in planes extending transversely of the path of travel with the hangers 6 being of branching form as illustrated.

The arcuate low level portion 7c of the conveyor track is shown in Fig. 1 as being of about 270° arcuate extent. However it will be understood that this portion of the track may be of any selected arcuate extent depending upon the selected relation between the speed of travel of the conveyor and the length of time the mandrels are to remain in the dip. The arcuate extent might, for example, be only 180° or even less, or on the other hand might approach a full 360° turn, being sufficiently less to provide for bends 18 of satisfactory radius between the arcuate portion of the track and the entering and leaving portions connected thereto.

Tank 10 is rotated at such a speed that the movement of the body of liquid 11 is synchronized with the advancing travel of mandrels 5. Any suitable rotatable mounting for the tank may be provided. Merely by way of example I have shown bearing rollers 20 travelling between a bearing race 21 on the bottom of the tank 10 and a bearing race 22 supported upon suitable supports 23. Any suitable drive may be utilized. For example, a fractional horsepower motor 24 may be suitably mounted and provided with a reduction gearing 25 driving a pinion 26 which in turn drives the tank 10 through a ring gear 27 secured thereto.

In the operation of the apparatus, the mandrels 5 approach the tank 10 while travelling in an elevated portion of their path guided by elevated horizontal portion 7a of the track 7. As they pass over the outer wall 16 of the tank, they commence to descend along an inclined path guided by the inclined portion 7b of the track. Although at first there is some relative movement between the mandrels and the body 11 in a direction radially of the tank, provision may be made so that this radial movement will be eliminated at or prior to the point where the mandrels dip into the body 11. This may be provided for by having the concentric curvature of the track extend into the inclined portions 7b and 7d for those portions of their lengths which are co-extensive with those portions of the paths of the mandrels in which they actually enter and leave the body 11.

In the operation of the apparatus, the tank 10 is rotated synchronously with the forward travel of conveyor chain 9, whereby as the mandrels dip into the body 11, remain in the body 11 for a pre-selected length of time, and are then removed from the body 11, they will continuously be synchronized in their forward travel with the movement of the body 11, the latter movement being established by the rotating movement of tank 10; and as a result, the only relative movement between the mandrels and the body 11 will be a purely vertical dipping movement. A high degree of uniformity in wall thickness and color texture is thereby attained.

One of the important characteristics of the invention is in the quiescent state in which the body of liquid plastic material is maintained. This is made possible by rotating the tank instead of attempting to circulate the liquid in a circular path within the tank. By maintaining the liquid body substantially quiescent while mandrels are dipped into it and removed therefrom, maximum uniformity of wall thickness is obtained.

With particular reference to the wording of the appended claims, the more important parts of the apparatus, and the different portions of the path of movement of the mandrels, may be referred to as follows:

Conveyor part 7a—elevated part for elevated, level approaching portion of path;

Conveyor part 7b—downwardly inclined part for entering portion of mandrel path;

Conveyor part 7c—low level part for low level portion of mandrel path;

Conveyor part 7d—upwardly inclined part for leaving path;

Conveyor part 7e—elevated level part for second elevated level, receding path of mandrel movement.

I claim:

1. In an apparatus for dip-forming flexible hollow articles: a series of dipping mandrels; said mandrels each having an outer surface shaped to impart to a respective hollow article an internal wall of the desired contour; a circular tank for a body of liquid material adapted to form on each mandrel, when dipped therein, a film which is convertible by curing into a solid wall of the hollow article; means supporting said tank for rotation in a horizontal plane about its vertical axis; means for rotating said tank; an endless conveyor from which said mandrels are suspended; a track for supporting and guiding said conveyor, said track having elevated portions of sufficient height to dispose the mandrels at a level clearing the top of the tank, for guiding the mandrels in paths respectively approaching and receding from the tank, having inclined portions for guiding the mandrels respectively in an entering path in which the mandrels are dipped into the liquid body and a leaving path in which they are lifted out of the liquid body, and having a low level portion of circular arcuate configuration concentric with the circular path of movement of said tank at a radius inwardly of the periphery of the tank for guiding said mandrels in a substantially horizontal plane in a circular path in which the mandrels extend into the liquid body to a substantially fixed depth; means for driving said conveyor to impart movement to the mandrels in said paths; and means for correlating the movement of said conveyor with the rotation of said tank so as to effect substantial synchronization between the movements of the mandrels in said low-level path and the circumferential movement of the liquid in the tank at the radius of contact thereof with said mandrels.

2. Apparatus as defined in claim 1, wherein said inclined portions of track have at least portions thereof of arcuate form such that said entering and leaving paths will have horizontal components that are conformed to the circular configuration of the tank for at least those portions thereof in which the mandrels are being dipped into the liquid body and removed therefrom.

3. Apparatus as defined in claim 1, wherein said tank is of annular form, including outer and inner cylindrical lateral walls defining a circumferentially continuous annular chamber for said liquid body; and wherein said mandrels are carried in a path which is substantially centered radially between said outer and inner lateral walls.

4. Apparatus as defined in claim 1, wherein said tank is of annular form including outer and inner cylindrical lateral walls, wherein said conveyor means includes a series of hangers each of branching form and disposed in a vertical plane at right angles to the axis of the conveyor and adapted to assume a radial position within said tank, and wherein there is a series of mandrels supported upon each hanger, with each mandrel traveling with the liquid in said body.

References Cited in the file of this patent
UNITED STATES PATENTS

| | | |
|---|---|---|
| 1,947,990 | Hopkinson | Feb. 20, 1934 |
| 2,136,185 | Ferngren | Nov. 8, 1938 |
| 2,254,262 | Bratring | Sept. 2, 1941 |
| 2,351,202 | Hahne | June 13, 1944 |
| 2,451,961 | Landau | Oct. 19, 1948 |
| 2,575,789 | Bogin | Nov. 20, 1951 |